(12) United States Patent
Deng

(10) Patent No.: US 12,302,307 B2
(45) Date of Patent: May 13, 2025

(54) METHOD AND APPARATUS FOR DETERMINING GROUPCAST FEEDBACK RESOURCE, STORAGE MEDIUM AND USER EQUIPMENT

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 626 days.

(21) Appl. No.: 17/624,711

(22) PCT Filed: Apr. 27, 2020

(86) PCT No.: PCT/CN2020/087111
§ 371 (c)(1),
(2) Date: Jan. 4, 2022

(87) PCT Pub. No.: WO2021/004136
PCT Pub. Date: Jan. 14, 2021

(65) Prior Publication Data
US 2022/0248414 A1  Aug. 4, 2022

(30) Foreign Application Priority Data
Jul. 8, 2019  (CN) .......................... 201910609888.1

(51) Int. Cl.
*H04W 4/40* (2018.01)
*H04L 1/1812* (2023.01)
(Continued)

(52) U.S. Cl.
CPC ......... *H04W 72/121* (2013.01); *H04L 1/1812* (2013.01); *H04L 5/0053* (2013.01);
(Continued)

(58) Field of Classification Search
CPC .............. H04W 72/121; H04W 72/02; H04W 72/0446; H04W 72/1263; H04W 72/20;
(Continued)

(56) References Cited

U.S. PATENT DOCUMENTS

2017/0215183 A1  7/2017 Gulati et al.
2019/0052436 A1* 2/2019 Desai ................ H04W 72/0446
(Continued)

FOREIGN PATENT DOCUMENTS

CN  108039939 A  5/2018
CN  108347313 A  7/2018
(Continued)

OTHER PUBLICATIONS

3GPP TSG RAN WG1 Meeting #95, R1-1812541 Title: Enhancement on SRS resource allocation (Year: 2018).*
(Continued)

*Primary Examiner* — Christopher M Crutchfield
*Assistant Examiner* — Abusayeed M Haque
(74) *Attorney, Agent, or Firm* — CANTOR COLBURN LLP

(57) ABSTRACT

A method and apparatus for determining a groupcast feedback resource, a storage medium and a User Equipment (UE) are provided. The method is applied at a first Receiver (Rx) UE and includes: receiving sidelink control information and transmission data from a Transmitter (Tx) UE, wherein the Tx UE transmits the sidelink control information and the transmission data using a groupcast mode; determining a position of a first available feedback resource based on a position of the transmission data scheduled by the sidelink control information and a second preset mapping relationship; and determining the feedback resource for the first Rx UE based on an intra-group identifier of the first Rx UE and the position of the first available feedback resource.

19 Claims, 4 Drawing Sheets

(51) Int. Cl.
  *H04L 5/00* (2006.01)
  *H04W 4/08* (2009.01)
  *H04W 72/02* (2009.01)
  *H04W 72/0446* (2023.01)
  *H04W 72/121* (2023.01)
  *H04W 72/1263* (2023.01)
  *H04W 72/20* (2023.01)
  *H04W 72/231* (2023.01)

(52) U.S. Cl.
  CPC ....... *H04W 72/02* (2013.01); *H04W 72/0446* (2013.01); *H04W 72/1263* (2013.01); *H04W 72/20* (2023.01)

(58) Field of Classification Search
  CPC .... H04W 72/231; H04W 72/25; H04L 5/0053
  See application file for complete search history.

(56) References Cited

U.S. PATENT DOCUMENTS

| | | | |
|---|---|---|---|
| 2019/0320465 A1* | 10/2019 | Wu | H04W 74/0816 |
| 2019/0349895 A1 | 11/2019 | Liu et al. | |
| 2019/0363843 A1* | 11/2019 | Gordaychik | H04W 72/044 |
| 2020/0007247 A1* | 1/2020 | Gulati | H04B 17/373 |
| 2020/0008234 A1 | 1/2020 | Li et al. | |
| 2020/0053727 A1 | 2/2020 | Zhang et al. | |
| 2020/0100215 A1 | 3/2020 | Li et al. | |
| 2021/0266110 A1* | 8/2021 | Wang | H04W 72/0446 |
| 2022/0078757 A1* | 3/2022 | Wang | H04W 72/02 |
| 2022/0085920 A1* | 3/2022 | Baldemair | H04L 1/1861 |

FOREIGN PATENT DOCUMENTS

| | | |
|---|---|---|
| CN | 109792371 A | 5/2019 |
| CN | 109891981 A | 6/2019 |
| CN | 110944394 A | 3/2020 |
| EP | 3911067 A1 | 11/2021 |
| JP | 2020529801 A | 10/2020 |
| WO | 2018165926 A1 | 9/2018 |
| WO | 2018195826 A1 | 11/2018 |
| WO | 2019029652 A1 | 2/2019 |
| WO | 2019069234 A1 | 4/2019 |

OTHER PUBLICATIONS

3GPP TSG RAN WG1 Meeting #95, R1-1813231 Title: Discusion on Un-based Sidelink Resource Allocation and Configuration (Year: 2018).*
JPO Notice of Reasons for Refusal corresponding to JP Application No. 2022-500692; Mailing Date, Feb. 14, 2023.
EPO Extended European Search Report for corresponding EP Application No. 20836234.3; Issued on Aug. 2, 2022.
Huawei et al., "Sidelink physical layer procedures for NR V2X", 3GPP TSG RAN WG1 Meeting #97, RI-1906008, May 13-17, 2019; 23 pages.
Nokia et al., "Discussion on Sidelink groupcast HARQ", 3GPP TSG-RAN WG1 Meeting #96, R1-1902916, Feb. 25-Mar. 1, 2019; 9 pages.
International Search Report for International Application No. PCT/JP2020/087111; Date of Mailing; Jul. 9, 2020.

* cited by examiner

METHOD AND APPARATUS FOR DETERMINING GROUPCAST FEEDBACK RESOURCE, STORAGE MEDIUM AND USER EQUIPMENT

CROSS-REFERENCE TO RELATED APPLICATIONS

This is the U.S. National Stage of Application No. PCT/CN2020/087111, filed on Apr. 27, 2020. Priority under 35 U.S.C. § 119(a) and 35 U.S.C. § 365(b) is claimed from Chinese Application No. 201910609888.1, filed on Jul. 8, 2019, the disclosure of which is also incorporated herein by reference.

TECHNICAL FIELD

The present disclosure generally relates to communication technology field, and more particularly, to a method and apparatus for determining a groupcast feedback resource, a storage medium and a User Equipment (UE).

BACKGROUND

In Release 12, Long Term Evolution (LTE) systems introduced ProSe Direct Communication where at least two UEs can communicate directly through a PC5 interface. In direct communication, there are two modes of resource allocation, one being scheduled resource allocation which is configured by a base station via dedicated signaling, and the other being automatic resource selection, where a base station provides a UE with a resource pool for direct communication via system information or Radio Resource Control (RRC) signaling, and the UE selects resources for direct communication from the resource pool. If a Transmitter UE (Tx UE) is not within a network coverage, the UE adopts the automatic resource selection method to select resources for direct communication from a pre-configured resource pool. Based on direct communication, the 3rd Generation Partnership Project (3GPP) also supports Vehicle-to-Everything (V2X). Within a network coverage, a UE may transmit V2X messages to multiple UEs. It should be noted that both Receiver UEs (Rx UEs) and the Tx UE may not be within the network coverage, or some UEs may be within the network coverage.

Presently, 3GPP is studying the introduction of V2X into New Radio (NR) systems. As 5G systems can provide larger bandwidth and lower latency, it can better meet service requirements of V2X. Besides, 3GPP has agreed that NR V2X can use unicast, groupcast or broadcast to transmit V2X services. Feedback may be introduced based on unicast or groupcast being used by a Tx UE. There is no exact solution for how the Rx UE feedback, that is, which feedback resource is used to transmit feedback information to the Tx UE. Especially for groupcast, 3GPP agrees that Hybrid Automatic Repeat reQuest (HARQ) feedback can be used or HARQ feedback is not used. When HARQ feedback is applied, group members are allowed to use independent feedback resources, i.e., independent Physical Sidelink Feedback Channel (PSFCH) resources.

The Tx UE may determine whether to perform Groupcast with feedback based on service quality parameters of groupcast services and parameters of network configuration. For example, the base station may associate feedback resources when configuring a transmission resource pool. An Rx UE has a processing delay. For example, when receiving V2X data sent by Tx UE in a time slot n, an Rx UE needs a certain time to decode the received signal to determine whether the data is received accurately. For accurate reception, the Rx UE feedbacks an Acknowledgement (ACK) using PSFCH at a certain time after the time slot n, such as a time slot (n+k). For inaccurate reception, the Rx UE feedbacks a Negative-Acknowledgment (NACK) using PSFCH at the time slot (n+k). A value of K has not yet been determined in the standard, and depends on a minimum processing delay of all UEs supporting V2X services.

SUMMARY

Embodiments of the present disclosure may determine a feedback resource for an Rx UE feeding back a groupcast data reception status.

In an embodiment of the present disclosure, a method for determining a groupcast feedback resource is provided, including: a first Rx UE receiving sidelink control information and transmission data from a Tx UE, wherein the Tx UE transmits the sidelink control information and the transmission data to Rx UEs using a groupcast mode, wherein the Rx UEs and the Tx UE constitute a group; determining positions of available feedback resources allocated for the Rx UEs at least based on the sidelink control information, wherein the sidelink control information directly or indirectly indicates the positions of the available feedback resources; and determining the available feedback resource for the first Rx UE based on an intra-group identifier of the first Rx UE and a first preset mapping relationship between intra-group identifiers and the available feedback resources allocated for the Rx UEs.

Optionally, the sidelink control information indicates a position of a first available feedback resource and a resource interval, and said determining positions of available feedback resources allocated for the Rx UEs at least based on the sidelink control information includes: determining the positions of the available feedback resources based on the position of the first available feedback resource and the resource interval.

Optionally, the sidelink control information indicates a resource interval, and said determining positions of available feedback resources allocated for the Rx UEs at least based on the sidelink control information includes: determining a position of a first physical resource block of a transmission resource carrying the transmission data; determining a position of a first available feedback resource based on the position of the first physical resource block and a second preset mapping relationship, wherein the second preset mapping relationship represents a mapping relationship between the position of the first physical resource block and the position of the first available feedback resource; and determining the positions of the available feedback resources based on the position of the first available feedback resource and the resource interval.

Optionally, the sidelink control information indicates a resource interval, and said determining positions of available feedback resources allocated for the Rx UEs at least based on the sidelink control information includes: determining a position of a physical resource block carrying the sidelink control information; determining a position of a first available feedback resource based on the position of the physical resource block and a third preset mapping relationship, wherein the third preset mapping relationship represents a mapping relationship between the position of the physical resource block carrying the sidelink control information and the position of the first available feedback resource; and determining the positions of the available feedback resources based on the position of the first available feedback resource and the resource interval.

Optionally, the sidelink control information indicates a position of a first available feedback resource and a resource interval, and said determining positions of available feedback resources allocated for the Rx UEs at least based on the sidelink control information includes: determining a number of the available feedback resources based on cell system information; determining a resource interval based on a number of the Rx UEs in the group and the number of the available feedback resources; and determining the positions of the available feedback resources based on the position of the first available feedback resource and the resource interval.

Optionally, said determining a number of the available feedback resources based on cell system information includes: determining a number of the available feedback resources in a neighboring cell based on V2X resource configuration information of the neighboring cell in the cell system information, in view of the Rx UEs and the Tx UE belonging to different cells.

Optionally, the sidelink control information indicates a position of a first available feedback resource and a number of the available feedback resources, and said determining positions of available feedback resources allocated for the Rx UEs at least based on the sidelink control information includes: determining a resource interval based on a number of the Rx UEs in the group and the number of the available feedback resources; and determining the positions of the available feedback resources based on the position of the first available feedback resource and the resource interval.

Optionally, a number of the available feedback resources is equal to a number of the Rx UEs, the first preset mapping relationship indicates that an intra-group identifier having a sequence number among the intra-group identifiers corresponds to an available feedback resource having the same sequence number among the available feedback resources, and said determining the available feedback resource for the first Rx UE based on the intra-group identifier of the first Rx UE and the first preset mapping relationship between intra-group identifiers and the available feedback resources allocated for the Rx UEs includes: sorting the intra-group identifiers in the group, and determining a sequence number of the intra-group identifier of the first Rx UE among the intra-group identifiers in the group; sorting the available feedback resources based on the positions of the available feedback resources, and determining an available feedback resource with the sequence number among the available feedback resources; and determining the available feedback resource with the sequence number as the available feedback resource for the first Rx UE.

Optionally, the sidelink control information indicates whether the available feedback resources are consecutive, and following receiving the sidelink control information and the transmission data, the method further includes: determining whether the available feedback resources are consecutive based on the sidelink control information, wherein the first preset mapping relationship includes consecutive mapping and interleaving mapping.

Optionally, the Tx UE determines whether the available feedback resources are consecutive based on system information or RRC signaling of a serving base station.

Optionally, the available feedback resources are PSFCH resources.

In an embodiment of the present disclosure, a method for determining a groupcast feedback resource is provided, being applied at a first Rx UE and including: receiving sidelink control information and transmission data from a Tx UE, wherein the Tx UE transmits the sidelink control information and the transmission data using a groupcast mode; determining a position of a first available feedback resource based on a position of the transmission data scheduled by the sidelink control information and a second preset mapping relationship; and determining the feedback resource for the first Rx UE based on an intra-group identifier of the first Rx UE and the position of the first available feedback resource.

Optionally, the second preset mapping relationship represents a mapping relationship between the position of the transmission data scheduled by the sidelink control information and the position of the first available feedback resource.

Optionally, the sidelink control information indicates whether available feedback resources are consecutive, and following receiving the sidelink control information and the transmission data from the Tx UE, the method further includes: determining whether the available feedback resources are consecutive based on the sidelink control information, wherein a mapping relationship of the available feedback resources includes consecutive mapping and interleaving mapping.

Optionally, the Tx UE determines whether the available feedback resources are consecutive based on system information or RRC signaling of a serving base station.

Optionally, based on the mapping relationship of the available feedback resources being consecutive mapping, feedback resources for Rx UEs are determined according to an order of intra-group identifiers of the Rx UEs and the position of the first available feedback resource; or based on the mapping relationship of the available feedback resources being interleaving mapping, a resource interval is obtained from the sidelink control information, and feedback resources for Rx UEs are determined according to the position of the first available feedback resource and intra-group identifiers of the Rx UEs.

Optionally, a number of available feedback resources is equal to a number of Rx UEs, and said determining the feedback resource for the first Rx UE based on an intra-group identifier of the first Rx UE and the position of the first available feedback resource includes: sorting the intra-group identifiers in a same group, and determining a sequence number of the intra-group identifier of the first Rx UE among the intra-group identifiers in the group; sorting the available feedback resources based on positions of the available feedback resources, and determining an available feedback resource with the sequence number among the available feedback resources; and determining the available feedback resource with the sequence number as the feedback resource for the first Rx UE.

Optionally, the feedback resource and the first available feedback resource are PSFCH resources.

In an embodiment of the present disclosure, a storage medium having computer instructions stored therein is provided, wherein when the computer instructions are executed, the above method is performed.

In an embodiment of the present disclosure, a UE including a memory and a processor is provided, wherein the memory has computer instructions stored therein, and when the processor executes the computer instructions, the above method is performed.

DETAILED DESCRIPTION

As described in the background, for groupcast, when the Tx UE determines that all members in the group use independent feedback resources for feedback, how to determine the feedback resource of each Rx UE is a technical problem to be solved urgently.

In embodiments of the present disclosure, the Tx UE can directly or indirectly indicate the positions of the available feedback resources via the sidelink control information, and accordingly the Rx UE can determine the positions of the available feedback resources at least based on the sidelink control information. Further, there is a first preset mapping relationship between the intra-group identifiers of the Rx UEs within the same group and the available feedback resources allocated for the Rx UEs. Each Rx UE can determine its current available feedback resource based on its own intra-group identifier and the first mapping relationship. By embodiments of the present disclosure, when the number of group members is unknown, a network no longer allocates an independent feedback resource for each data transmission resource (such as a PSSCH resource), which may avoid a waste or insufficiency of feedback resources. Further, the embodiments of the present disclosure may enable the feedback resources used by different Rx UEs to occupy an entire feedback resource pool in a dispersed manner, thereby achieving a load balance.

In embodiments of the present disclosure, the UEs support V2X, such as 5G V2X.

In some embodiments, the transmission data may be V2X data.

In some embodiments, the available feedback resources may be PSFCH resources.

In order to clarify the objects, characteristics and advantages of the disclosure, embodiments of present disclosure will be described in detail in conjunction with accompanying drawings.

Figure 1:
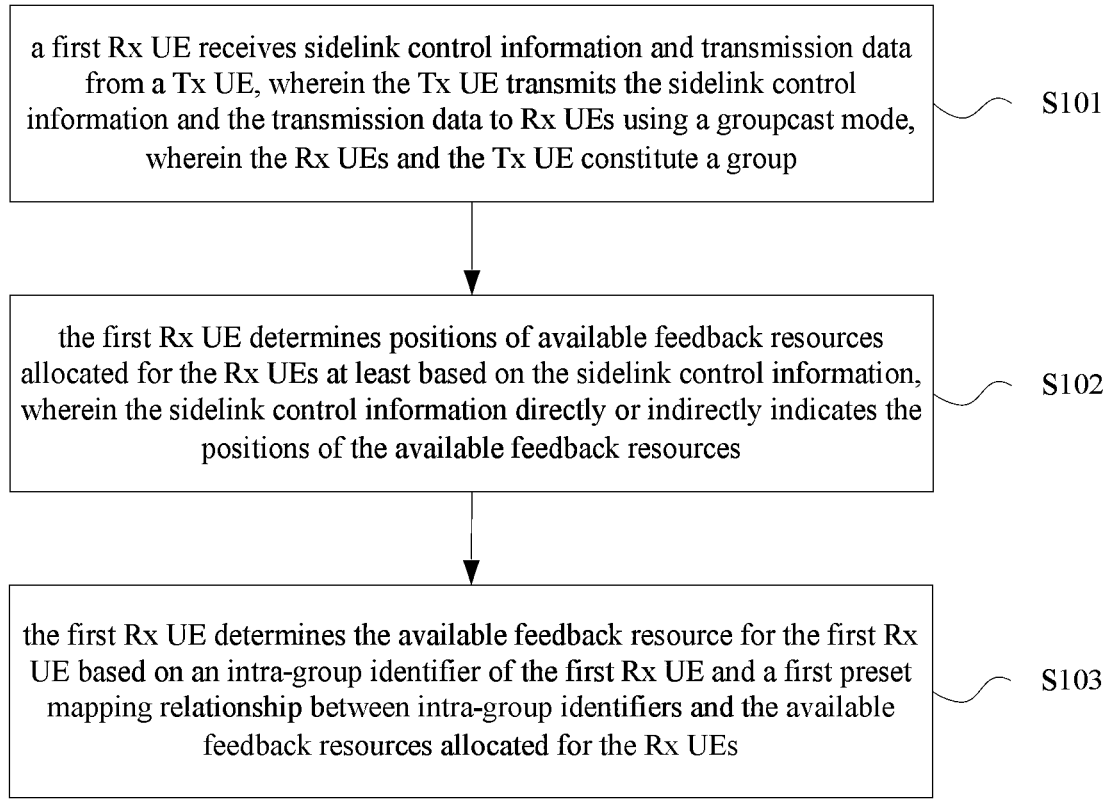
FIG. 1 is a flow chart of a method for determining a groupcast feedback resource according to an embodiment.

FIG. 1 is a flow chart of a method for determining a groupcast feedback resource according to an embodiment.

The method may include S101 to S103.

In S101, a first Rx UE receives sidelink control information and transmission data from a Tx UE, wherein the Tx UE transmits the sidelink control information and the transmission data to Rx UEs using a groupcast mode, wherein the Rx UEs and the Tx UE constitute a group.

In S102, the first Rx UE determines positions of available feedback resources allocated for the Rx UEs at least based on the sidelink control information, wherein the sidelink control information directly or indirectly indicates the positions of the available feedback resources.

In S103, the first Rx UE determines the available feedback resource for the first Rx UE based on an intra-group identifier of the first Rx UE and a first preset mapping relationship between intra-group identifiers and the available feedback resources allocated for the Rx UEs.

It should be noted that the sequence number of each step in the embodiments does not limit an execution order of the step.

Those skilled in the art could understand that members of a group are pre-configured. For example, an operator may manage constitution of the group, including a number of members and intra-group identifiers of the members. For another example, the group may be configured temporarily and include the number of members and intra-group identifiers of the members. The detailed way for configuring the group is not limited in embodiments of the present disclosure.

The method for determining the groupcast feedback resource in the embodiments may be applied in the Rx UE side, where the Tx UE transmits V2X data, the Rx UE receives the V2X data, and the Rx UE and the Tx UE are in the same group. UEs in the same group may transmit V2X data to each other in a groupcast manner.

In some embodiments, each UE in the same group knows the number of members in the group. For example, there are 6 UEs in Group1, UE1 is a Tx UE, and UE2 to UE6 are Rx UEs. UE1 to UE6 know that there are 6 UEs in Group 1 including one Tx UE and five Rx UEs.

In some embodiments, the Tx UE transmits Sidelink Control Information (SCI) through a Physical Sidelink Control Channel (PSCCH). The SCI indicates a position of a Physical Sidelink Shared Channel (PSSCH) and parameters such as a modulation and coding format. Further, in some embodiments of S101, the Rx UE receives the SCI, determines the position of the PSSCH based on the SCI, and receives V2X data from the PSSCH.

As the SCI can directly or indirectly indicate the positions of the available feedback resources, and the Rx UEs and the Tx UE are in the same group, in some embodiments of S102, each Rx UE may at least determine the positions of the available feedback resources allocated for the Rx UEs based on the SCI.

Specifically, if the SCI directly indicates the positions of the available feedback resources, the Rx UE can directly determine the positions of the available feedback resources based on the SCI. If the SCI indirectly indicates the positions of the available feedback resources, the Rx UE may determine the positions of the available feedback resources by calculation based on other known parameters.

In some embodiments, the UEs in each group have intra-group identifiers. For example, for 6 UEs in Group 1, their intra-group identifiers (or numbers) are 1, 2, 3, 4, 5 and 6. When the Tx UE has the identifier 1, the UEs with identifiers 2, 3, 4, 5 and 6 are Rx UEs. When the Tx UE has the identifier 2, the UEs with identifiers 1, 3, 4, 5 and 6 are Rx UEs. Other scenarios can be deduced by analogy. A UE that receives V2X data can identify the Tx UE from the received SCI and the received V2X data.

Different Rx UEs need to use different feedback resources to feed back a reception status of transmission data. To ensure that the available feedback resources are allocated to the Rx UEs orderly, in some embodiments of S103, the Rx UE may determine the available feedback resource based on its intra-group identifier and a first preset mapping relationship between intra-group identifiers and the available feedback resources.

For example, the available feedback resources are the third, sixth, ninth, twelfth and fifth PSFCH resources in a PSFCH resource pool. When the identifier of the Tx UE is 1, and the identifiers of the Rx UEs are 2, 3, 4, 5 and 6, the identifiers 2, 3, 4, 5 and 6 correspond to the third, sixth, ninth, twelfth and fifth PSFCH resources in the PSFCH resource pool, respectively. Accordingly, the feedback resource allocated for UE2 is the third PSFCH resource, the feedback resource allocated for UE3 is the sixth PSFCH resource, the feedback resource allocated for UE4 is the ninth PSFCH resource, the feedback resource allocated for UE5 is the twelfth PSFCH resource, the feedback resource used by UE6 is the fifth PSFCH resource.

The available feedback resource determined in S103 may be used for the first Rx UE to feed back the reception status of the transmission data. For example, an ACK fed back using the available feedback resource indicates that the transmission data is successfully received, while a NACK fed back using the available feedback resource indicates that the transmission data has not been successfully received.

By embodiments of the present disclosure, when the number of group members is unknown, a network no longer allocates an independent feedback resource for each data transmission resource (such as a PSSCH resource), which may avoid a waste or insufficiency of feedback resources. Further, the embodiments of the present disclosure may enable the feedback resources used by different Rx UEs to occupy an entire feedback resource pool in a dispersed manner, thereby achieving a load balance.

In some embodiments, the sidelink control information indicates a position of a first available feedback resource and a resource interval, and S102 as shown in FIG. 1 includes: determining the positions of the available feedback resources based on the position of the first available feedback resource and the resource interval.

In some embodiments, the Tx UE may indicate the position of the first available feedback resource and the resource interval in SCI. For example, the position of the first available feedback resource points to a third PSFCH resource in a PSFCH resource pool, and the resource interval is 2.

As the first Rx UE knows the total number of the Rx UEs in the group in advance, the first Rx UE can determine the total number of available feedback resources and determine the positions of the available feedback resources based on indication of the SCI. For example, the total number of the Rx UEs in the group is 5. The first Rx UE may determine that the available feedback resources are the third, sixth, ninth, twelfth and fifth PSFCH resources in the PSFCH resource pool, and determine the PSFCH resources used by the Rx UEs in the group based on the intra-group identifiers, for example, based on a sequence of the intra-group identifiers of the Rx UEs.

In the embodiments of the present disclosure, the position of the first available feedback resource and the resource interval are indicated, so that each Rx UE can determine its available feedback resource, and a conflict among the available feedback resources for Rx UEs in different groups may be avoided. When the resource interval is 1, that is, when the feedback resources corresponding to the Rx UEs in the group are consecutive, the resource interval may not be indicated. That is, a default value of the resource interval is 1, and when the default value is adopted, the resource interval may not be indicated in the SCI.

Figure 2:
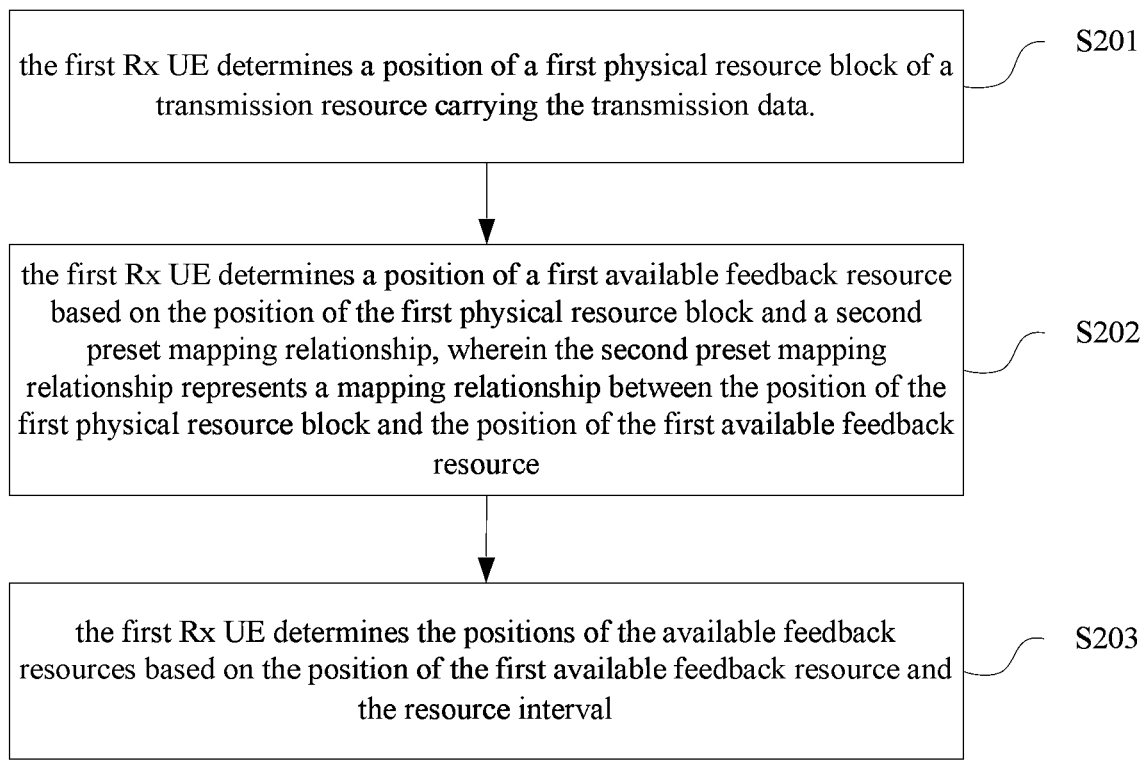
FIG. 2 is a flow chart of S102 as shown in FIG. 1 according to an embodiment.

In some embodiments, the sidelink control information indicates a resource interval. Referring to FIG. 2, S102 as shown in FIG. 1 includes S201, S202 and S203.

In S201, the first Rx UE determines a position of a first physical resource block of a transmission resource carrying the transmission data.

In S202, the first Rx UE determines a position of a first available feedback resource based on the position of the first physical resource block and a second preset mapping relationship, wherein the second preset mapping relationship represents a mapping relationship between the position of the first physical resource block and the position of the first available feedback resource.

In S203, the first Rx UE determines the positions of the available feedback resources based on the position of the first available feedback resource and the resource interval.

In some embodiments, the Tx UE may merely indicate the resource interval in the SCI. To determine the available feedback resources, the first Rx UE also needs to know the position of the first available feedback resource. In this case, a mapping relationship between the position of the first available feedback resource and a known parameter, such as a position of a first physical resource block of a transmission resource carrying the transmission data, may be configured in advance.

Specifically, the transmission resource may be a PSSCH, and usually are consecutive physical resource blocks, and the second preset mapping relationship may indicate the mapping relationship between the position of the first physical resource block of the PSSCH and the position of the first available PSFCH feedback resource. More specifically, the position of the first physical resource block may be represented by an index of the first physical resource block.

In some embodiments, a third preset mapping relationship may indicate a mapping relationship between a position of a physical resource block carrying the SCI and a position of the first available PSFCH feedback resource. The first Rx UE may determine the position of the first available PSFCH feedback resource based on the position of the physical resource block carrying the SCI and the third preset mapping relationship.

It can be understood that both PSSCH and SCI refer to the PSSCH and SCI when the first Rx UE receives the V2X data from the Tx UE. The first Rx UE may detect the SCI and PSSCH sent by multiple Tx UEs, but merely receives the PSSCH and SCI sent by the Tx UE the first Rx UE is interested in, such as receiving V2X data sent by a UE in the same group.

Further, in S201 and S202, the first Rx UE may calculate and determine the position of the first available feedback resource, and further determine the positions of the available feedback resources based on the resource interval in the SCI.

Figure 3:
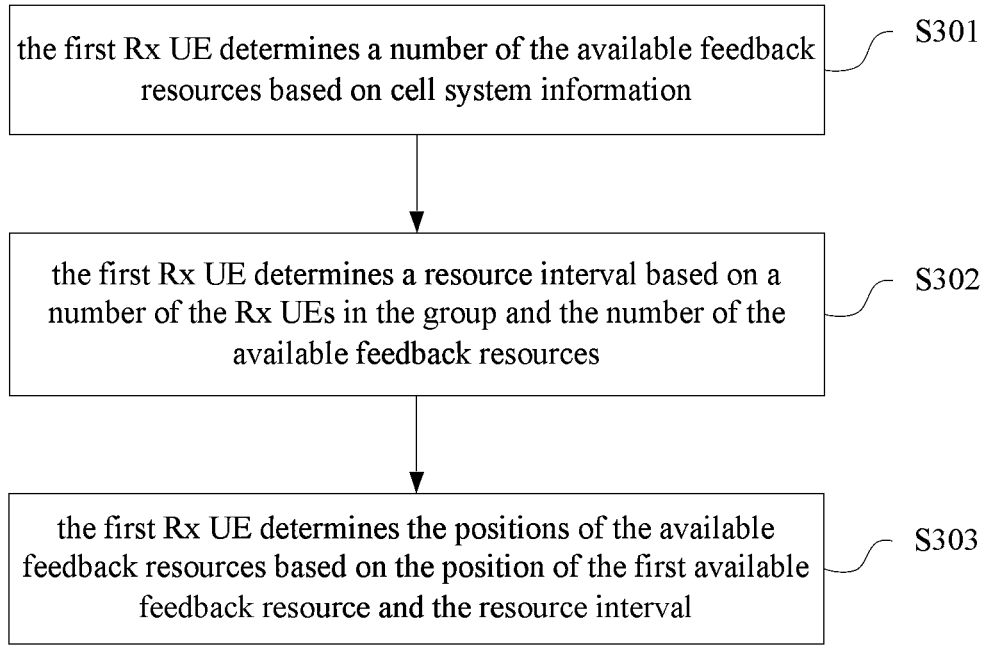
FIG. 3 is a flow chart of S102 as shown in FIG. 1 according to an embodiment.

In some embodiments, the sidelink control information indicates a position of a first available feedback resource. Referring to FIG. 3, S102 as shown in FIG. 1 includes S301, S302 and S303.

In S301, the first Rx UE determines a number of the available feedback resources based on cell system information.

In S302, the first Rx UE determines a resource interval based on a number of the Rx UEs in the group and the number of the available feedback resources.

In S303, the first Rx UE determines the positions of the available feedback resources based on the position of the first available feedback resource and the resource interval.

In some embodiments, the Tx UE may merely indicate the position of the first available feedback resource in the SCI. To determine the available feedback resources, the first Rx UE also needs to know the resource interval. In this case, the number of the available feedback resources may be notified to the first Rx UE in advance, so that the Rx UE can calculate the resource interval.

In some embodiments, the resource interval calculated is a positive integer.

In some embodiments, a base station may notify the first Rx UE of the total number of feedback resources in the feedback resource pool via system information. As the number of the Rx UEs in the group is known, the first Rx UE can calculate the resource interval. Specifically, the resource interval may be calculated based on a formula of INT(N/M), where N represents the total number of the feedback resources in the feedback resource pool, M represents the number of the Rx UEs in the group, and INTO represents a rounding function including rounding up or rounding down.

In some embodiments, the Tx UE and the Rx UEs may be located within a same cell or in different cells.

In some embodiments, S301 as shown in FIG. 3 may further include a following step. If the first Rx UE and the Tx UE belong to different cells, the first Rx UE acquires the number of the available feedback resources in a neighboring cell via V2X resource configuration information of the neighboring cell in the cell system information.

In some embodiments, the cell system information includes the V2X resource configuration information of the neighboring cell, and the V2X resource configuration information of the neighboring cell includes the number of available feedback resources in the neighboring cell.

In an application scenario, the Tx UE and a portion of the Rx UEs are located in Cell1, and the portion of the Rx UEs can learn the number of PSFCH resources via system information of the current cell. The remaining portion of the Rx UEs in the group are within an adjacent Cell2, and can receive system information from Cell2 which indicates V2X resource configuration of the neighboring cell Cell1 which includes the number of PSFCH resources configured by the Cell1. The Rx UE in Cell2 can learn that the Tx UE is located within Cell1 by receiving the SCI and PSSCH sent by the Tx UE. Therefore, the Rx UE learns the number of PSFCH resources corresponding to Groupcast transmitted by the Tx UE based on configuration parameters of the system information, and further determines a PSFCH resource interval based on the number of members in the group. As mentioned above, the group has 6 members including 5 Rx UEs. If the total number of PSFCH resources (that is, the number of PSFCH resources corresponding to the Groupcast transmission resource pool configured by Cell1) is N, the resource interval is determined as INT (N/5), and the value is an integer. In this way, the first Rx UE can determine all available PSFCH resources in turn, and then, based on the identifiers in the group, acquire the PSFCH resource used by itself.

In some embodiments, the Tx UE indicates whether to use consecutive PSFCH mapping or interleaved PSFCH mapping in the SCI carrying V2X data sent to UEs in the same group. In this case, the SCI indicates the position of the first available feedback resource, or the position of the first available feedback resource is determined based on the position of PSSCH scheduled by the SCI and the second preset mapping relationship. When the Rx UE receives the SCI, it can know whether the PSFCH resources are consecutive. If they are consecutive, the UEs in the group may acquire corresponding PSFCH resources in sequence based on an order of the intra-group identifiers, after determining the position of the first available feedback resource. If the PSFCH resources are inconsecutive (that is, interleaved PSFCH mapping), in response to acquiring the resource interval, the UEs may determine the corresponding PSFCH resources by combining the position of the first available feedback resource and the intra-group identifiers. When the Tx UE is in the serving cell, a mapping relationship of the PSFCH resources may be acquired from system information or RRC signaling, that is, a serving base station of the Tx UE can indicate to the Tx UE whether the mapping of the PSFCH resources is consecutive via the system information or RRC signaling, where the serving base station can configure whether the PSFCH resources are consecutive based on the transmission resource pool, that is, when the Tx UE uses the transmission resources in the transmission resource pool, whether the PSFCH resources are consecutive is determined by the mapping relationship of the PSFCH resources associated with the resource pool. When the Tx UE adopts a base station scheduling resource mode, the serving base station may indicate whether the PSFCH resources corresponding to the allocated transmission resources for Groupcast transmission are consecutive via RRC signaling.

Figure 4:
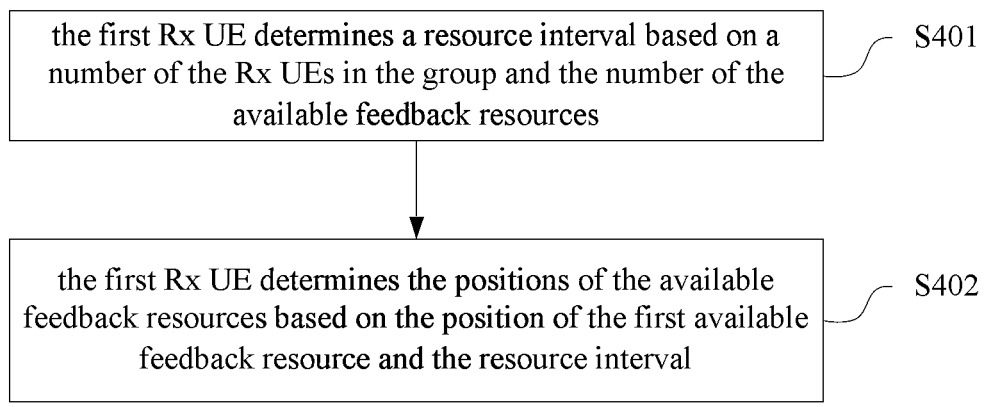
FIG. 4 is a flow chart of S102 as shown in FIG. 1 according to an embodiment.

In some embodiments, the sidelink control information indicates a position of a first available feedback resource and a number of the available feedback resources. Referring to FIG. 4, S102 as shown in FIG. 1 includes S401 and S402.

In S401, the first Rx UE determines a resource interval based on a number of the Rx UEs in the group and the number of the available feedback resources.

In S402, the first Rx UE determines the positions of the available feedback resources based on the position of the first available feedback resource and the resource interval.

In some embodiments, as the position of the first available feedback resource and the number of the available feedback resources are indicated in the SCI, the first Rx UE can calculate the resource interval, and further determine the positions of the available feedback resources based on the resource interval and the position of the first available feedback resource. In this case, the system information of the cell where the first Rx UE is located does not need to indicate information of the PSFCH resource of the neighboring cell.

Figure 5:
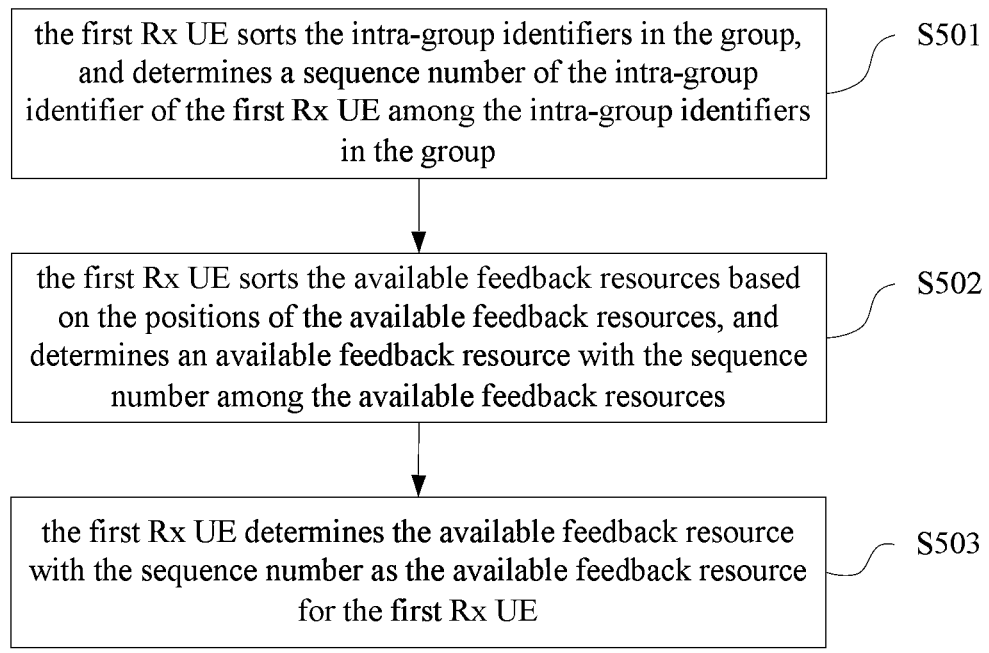
FIG. 5 is a flow chart of S103 as shown in FIG. 1 according to an embodiment.

In some embodiments, a number of the available feedback resources is equal to a number of the Rx UEs, and the first preset mapping relationship indicates that an intra-group identifier having a sequence number among the intra-group identifiers corresponds to an available feedback resource having the same sequence number among the available feedback resources. Referring to FIG. 5, S103 as shown in FIG. 1 includes S501, S502 and S503.

In S501, the first Rx UE sorts the intra-group identifiers in the group, and determines a sequence number of the intra-group identifier of the first Rx UE among the intra-group identifiers in the group.

In S502, the first Rx UE sorts the available feedback resources based on the positions of the available feedback resources, and determines an available feedback resource with the sequence number among the available feedback resources.

In S503, the first Rx UE determines the available feedback resource with the sequence number as the available feedback resource for the first Rx UE.

In some embodiments, as the number of the available feedback resources is equal to the number of the Rx UEs, the available feedback resources and the Rx UEs are sorted separately in a certain order to obtain a corresponding relationship, and the available feedback resource for each Rx UE is determined based on the corresponding relationship.

In an application scenario, the members in the group determine the PSFCH resources to be used based on their intra-group sequence numbers. Their intra-group sequence numbers are 1, 2, 3, 4, 5 and 6. If the intra-group sequence number of the Tx UE is 4, the intra-group sequence numbers of the Rx UEs are 1, 2, 3, 5 and 6, respectively. The intra-group sequence numbers of the Rx UEs are sorted from small to large to obtain 1, 2, 3, 5 and 6. As mentioned above, the available feedback resources are sorted in order to obtain the third, the sixth, the ninth, the twelfth and the fifteenth PSFCH resources. Therefore, numbers 1, 2, 3, 5 and 6 correspond to the third, the sixth, the ninth, the twelfth and the fifteenth PSFCH resources" respectively. Based on this corresponding relationship, it is determined that the Rx UEs with intra-group sequence numbers 1, 2 and 3 use the third, the sixth and the ninth PSFCH resources, respectively. The UEs with intra-group sequence numbers 5 and 6 use the twelfth and the fifteenth PSFCH resources, respectively.

In another application scenario, if the Rx UEs and the available feedback resources are not sorted, the PSFCH resources may be determined directly based on the intra-group sequence numbers. If the intra-group sequence number of the Tx UE is smaller than that of the Rx UE, the intra-group sequence number of the Rx UE is subtracted by 1, and the PSFCH resource corresponding to the intra-group sequence number subjected to the subtraction is adopted. For example, the intra-group sequence numbers are 1, 2, 3, 4, 5 and 6. When the intra-group sequence number of the Tx UE is 4, the Rx UEs with the intra-group sequence numbers 1, 2 and 3 use the third, the sixth and the ninth PSFCH resources, respectively. As the intra-group sequence number of the Tx UE is 4, the Rx UE with the intra-group sequence number 5 uses the PSFCH resource corresponding to (5−1=4), i.e., the twelfth PSFCH resource, and the Rx UE with the intra-group sequence number 6 uses the fifteenth PSFCH resource.

Figure 6:
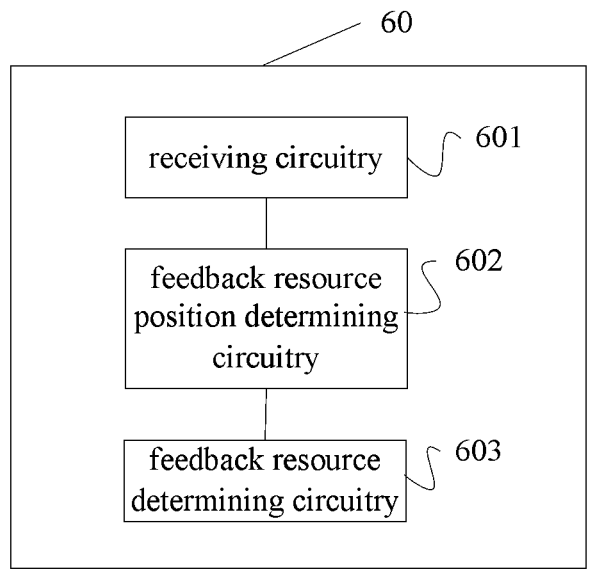
FIG. 6 is a structural diagram of an apparatus for determining a groupcast feedback resource according to an embodiment.

Referring to FIG. 6, FIG. 6 is a structural diagram of an apparatus 60 for determining a groupcast feedback resource according to an embodiment. The apparatus 60 includes a receiving circuitry 601, a feedback resource position determining circuitry 602 and a feedback resource determining circuitry 603.

The receiving circuitry 601 is configured to receive sidelink control information and transmission data from a Tx UE, wherein the Tx UE transmits the sidelink control information and the transmission data to Rx UEs using a groupcast mode, wherein the Rx UEs and the Tx UE constitute a group. The feedback resource position determining circuitry 602 is configured to determine positions of available feedback resources allocated for the Rx UEs at least based on the sidelink control information, wherein the sidelink control information directly or indirectly indicates the positions of the available feedback resources. The feedback resource determining circuitry 603 is configured to determine the available feedback resource for the first Rx UE based on an intra-group identifier of the first Rx UE and a first preset mapping relationship between intra-group identifiers and the available feedback resources allocated for the Rx UEs.

By embodiments of the present disclosure, when the number of group members is unknown, a network no longer allocates an independent feedback resource for each data transmission resource (such as a PSSCH resource), which may avoid a waste or insufficiency of feedback resources. Further, the embodiments of the present disclosure may enable the feedback resources used by different Rx UEs to occupy an entire feedback resource pool in a dispersed manner, thereby achieving a load balance.

More details of working principles and working modes of the apparatus 60 can be found in the above descriptions of FIG. 1 to FIG. 5, and are not described here.

In an embodiment of the present disclosure, a storage medium having computer instructions stored therein is provided, wherein when the computer instructions are executed, any one of the above methods as shown in FIG. 1 to FIG. 5 is performed. The storage medium may include a Read Only Memory (ROM), a Random Access Memory (RAM), a magnetic disk or an optical disk. In some embodiments, the storage medium may be a computer readable storage medium, such as a non-volatile memory or a non-transitory memory.

In an embodiment of the present disclosure, a UE including a memory and a processor is provided, wherein the memory has computer instructions stored therein, and when the processor executes the computer instructions, the method as shown in FIG. 1 to FIG. 5 is performed. The UE includes but is not limited to a mobile phone, a computer, a tablet or other terminal devices.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A method for determining a groupcast feedback resource, comprising:
   a first Receiver (Rx) User Equipment (UE) receiving sidelink control information and transmission data from a Transmitter (Tx) UE, wherein the Tx UE transmits the sidelink control information and the transmission data to Rx UEs using a groupcast mode, wherein the Rx UEs and the Tx UE constitute a group;
   determining positions of available feedback resources allocated for the Rx UEs at least based on the sidelink control information, wherein the sidelink control information directly or indirectly indicates the positions of the available feedback resources, and said determining positions of available feedback resources allocated for the Rx UEs at least based on the sidelink control information comprises determining the positions of the available feedback resources based on a position of a Physical Sidelink Shared Channel (PSSCH) indicated in the sidelink control information; and
   determining the available feedback resource for the first Rx UE based on an intra-group identifier of the first Rx UE and a first preset mapping relationship between intra-group identifiers and the available feedback resources allocated for the Rx UEs.

2. The method according to claim 1, wherein the sidelink control information indicates a position of a first available feedback resource and a resource interval, and said determining positions of available feedback resources allocated for the Rx UEs at least based on the sidelink control information comprises:
   determining the positions of the available feedback resources based on the position of the first available feedback resource and the resource interval.

3. The method according to claim 1, wherein the sidelink control information indicates a resource interval, and said determining positions of available feedback resources allocated for the Rx UEs at least based on the sidelink control information comprises:
   determining a position of a first physical resource block of the PSSCH carrying the transmission data;
   determining a position of a first available feedback resource based on the position of the first physical resource block and a second preset mapping relationship, wherein the second preset mapping relationship represents a mapping relationship between the position of the first physical resource block and the position of the first available feedback resource; and determining the positions of the available feedback resources based on the position of the first available feedback resource and the resource interval.

4. The method according to claim 1, wherein the sidelink control information indicates a resource interval, and said determining positions of available feedback resources allocated for the Rx UEs at least based on the sidelink control information comprises:
   determining a position of a physical resource block carrying the sidelink control information;
   determining a position of a first available feedback resource based on the position of the physical resource block and a third preset mapping relationship, wherein the third preset mapping relationship represents a mapping relationship between the position of the physical resource block carrying the sidelink control information and the position of the first available feedback resource; and
   determining the positions of the available feedback resources based on the position of the first available feedback resource and the resource interval.

5. The method according to claim 1, wherein the sidelink control information indicates a position of a first available feedback resource and a resource interval, and said determining positions of available feedback resources allocated for the Rx UEs at least based on the sidelink control information comprises:
   determining a number of the available feedback resources based on cell system information;
   determining a resource interval based on a number of the Rx UEs in the group and the number of the available feedback resources; and
   determining the positions of the available feedback resources based on the position of the first available feedback resource and the resource interval.

6. The method according to claim 5, wherein said determining a number of the available feedback resources based on cell system information comprises:
   determining a number of the available feedback resources in a neighboring cell based on V2X resource configuration information of the neighboring cell in the cell system information, in view of the Rx UEs and the Tx UE belonging to different cells.

7. The method according to claim 1, wherein the sidelink control information indicates a position of a first available feedback resource and a number of the available feedback resources, and said determining positions of available feedback resources allocated for the Rx UEs at least based on the sidelink control information comprises:
   determining a resource interval based on a number of the Rx UEs in the group and the number of the available feedback resources; and
   determining the positions of the available feedback resources based on the position of the first available feedback resource and the resource interval.

8. The method according to claim 1, wherein a number of the available feedback resources is equal to a number of the Rx UEs, the first preset mapping relationship indicates that an intra-group identifier having a sequence number among the intra-group identifiers corresponds to an available feedback resource having the same sequence number among the available feedback resources, and said determining the available feedback resource for the first Rx UE based on the intra-group identifier of the first Rx UE and the first preset mapping relationship between intra-group identifiers and the available feedback resources allocated for the Rx UEs comprises:
   sorting the intra-group identifiers in the group, and determining a sequence number of the intra-group identifier of the first Rx UE among the intra-group identifiers in the group;
   sorting the available feedback resources based on the positions of the available feedback resources, and determining an available feedback resource with the sequence number among the available feedback resources; and
   determining the available feedback resource with the sequence number as the available feedback resource for the first Rx UE.

9. The method according to claim 1, wherein the sidelink control information indicates whether the available feedback resources are consecutive, and following receiving the sidelink control information and the transmission data, the method further comprises:
   determining whether the available feedback resources are consecutive based on the sidelink control information, wherein the first preset mapping relationship comprises consecutive mapping and interleaving mapping.

10. The method according to claim 9, wherein the Tx UE determines whether the available feedback resources are consecutive based on system information or Radio Resource Control (RRC) signaling of a serving base station.

11. The method according to claim 1, wherein the available feedback resources are Physical Sidelink Feedback Channel (PSFCH) resources.

12. A method for determining a groupcast feedback resource, being applied at a first Receiver (Rx) User Equipment (UE) and comprising:
   receiving sidelink control information and transmission data from a Transmitter (Tx) UE, wherein the Tx UE transmits the sidelink control information and the transmission data using a groupcast mode;
   determining a position of a first available feedback resource based on a position of the transmission data scheduled by the sidelink control information and a second preset mapping relationship, wherein the second preset mapping relationship represents a mapping relationship between the position of the transmission data scheduled by the sidelink control information and the position of the first available feedback resource; and
   determining the feedback resource for the first Rx UE based on an intra-group identifier of the first Rx UE and the position of the first available feedback resource.

13. The method according to claim 12, wherein the sidelink control information indicates whether available feedback resources are consecutive, and following receiving the sidelink control information and the transmission data from the Tx UE, the method further comprises:
   determining whether the available feedback resources are consecutive based on the sidelink control information, wherein a mapping relationship of the available feedback resources comprises consecutive mapping and interleaving mapping.

14. The method according to claim 13, wherein the Tx UE determines whether the available feedback resources are consecutive based on system information or Radio Resource Control (RRC) signaling of a serving base station.

15. The method according to claim 13, wherein based on the mapping relationship of the available feedback resources being consecutive mapping, feedback resources for Rx UEs are determined according to an order of intra-group identifiers of the Rx UEs and the position of the first available feedback resource; or based on the mapping relationship of the available feedback resources being interleaving mapping, a resource interval is obtained from the sidelink control information, and feedback resources for Rx UEs are determined according to the position of the first available feedback resource and intra-group identifiers of the Rx UEs.

16. The method according to claim 12, wherein a number of available feedback resources is equal to a number of Rx UEs, and said determining the feedback resource for the first Rx UE based on an intra-group identifier of the first Rx UE and the position of the first available feedback resource comprises:
   sorting the intra-group identifiers in a same group, and determining a sequence number of the intra-group identifier of the first Rx UE among the intra-group identifiers in the group;
   sorting the available feedback resources based on positions of the available feedback resources, and determining an available feedback resource with the sequence number among the available feedback resources; and
   determining the available feedback resource with the sequence number as the feedback resource for the first Rx UE.

17. The method according to claim 12, wherein the feedback resource and the first available feedback resource are Physical Sidelink Feedback Channel (PSFCH) resources.

18. A non-transitory storage medium storing one or more programs, the one or more programs comprising computer instructions, which, when executed by a processor, cause the processor to:
   receiving sidelink control information and transmission data from a Transmitter (Tx) User Equipment (UE), wherein the Tx UE transmits the sidelink control information and the transmission data using a groupcast mode;
   determining a position of a first available feedback resource based on a position of the transmission data scheduled by the sidelink control information and a second preset mapping relationship, wherein the second preset mapping relationship represents a mapping relationship between the position of the transmission data scheduled by the sidelink control information and the position of the first available feedback resource; and
   determining the feedback resource for a Receiver (Rx) UE based on an intra-group identifier of the first Rx UE and the position of the first available feedback resource.

19. A User Equipment (UE) comprising a memory and a processor, wherein the memory has computer instructions stored therein, and when the processor executes the computer instructions, the method of claim 12 is performed.

* * * * *